Figure 1:
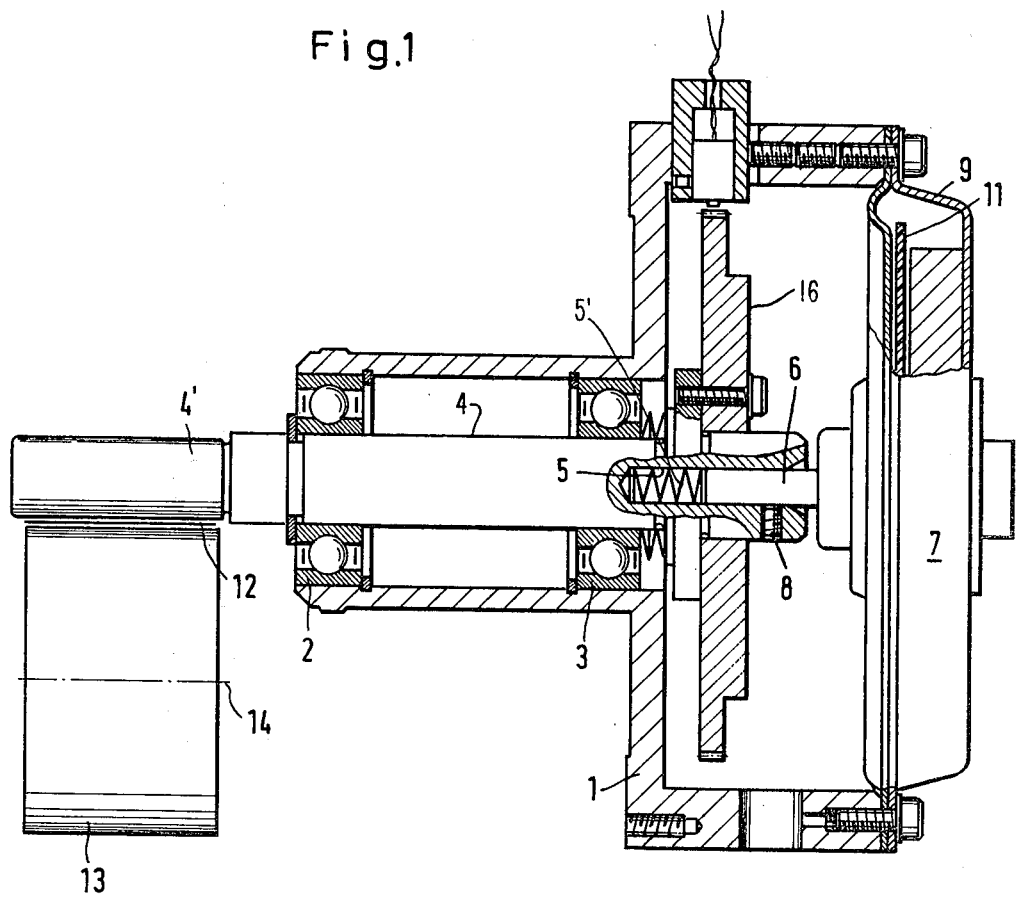

United States Patent [19]

Zahn et al.

[11] 4,420,109
[45] Dec. 13, 1983

[54] FLUTTER COMPENSATED MAGNETIC TAPE TRANSDUCING DRIVE APPARATUS

[75] Inventors: Heinrich Zahn; Gerhard Falk, both of Rossdorf, Fed. Rep. of Germany

[73] Assignee: Robert Bosch GmbH, Stuttgart, Fed. Rep. of Germany

[21] Appl. No.: 274,718

[22] Filed: Jun. 18, 1981

[30] Foreign Application Priority Data

Jul. 3, 1980 [DE] Fed. Rep. of Germany ....... 3025132

[51] Int. Cl.³ ............................................ B65H 17/20
[52] U.S. Cl. .................................... 226/181; 226/188
[58] Field of Search ................. 226/60, 188, 114, 181, 226/182

[56] References Cited

U.S. PATENT DOCUMENTS

| | | | |
|---|---|---|---|
| 2,499,210 | 2/1950 | Bartelson | 226/60 |
| 3,604,606 | 9/1971 | Marino et al. | 226/188 |
| 3,883,059 | 3/1975 | Nakamichi | 226/188 X |

FOREIGN PATENT DOCUMENTS

| | | |
|---|---|---|
| 1163090 | 2/1964 | Fed. Rep. of Germany . |
| 1189748 | 3/1965 | Fed. Rep. of Germany . |
| 1935828 | 7/1969 | Fed. Rep. of Germany . |
| 2350237 | 10/1975 | Fed. Rep. of Germany . |
| 55-34307 | 10/1980 | Japan . |

*Primary Examiner*—John M. Jillions
*Assistant Examiner*—Scott J. Haugland
*Attorney, Agent, or Firm*—Frishauf, Holtz, Goodman & Woodward

[57] ABSTRACT

To prevent external acceleration or deceleration forces from affecting the linear speed of a tape of a tape transport mechanism, counter-rotating masses are formed by the counter or pressure roller (13) engaging the tape and pressing the tape against the capstan (4'), the respective moments of inertia about the respective axes of rotation, and the respective radii being selected in accordance with the relationship $$\frac{j_1}{j_2} = \frac{r_1}{r_2}$$

wherein $j_1$ is the moment of inertia of the drive system about the axis of rotation of the drive capstan (4');
$r_1$ is the radius of the drive capstan (4');
$j_2$ is the moment of inertia of the counter or pressure roller (13) about its axis of rotation (14); and
$r_2$ is the radius of the counter or pressure roller (13).

2 Claims, 2 Drawing Figures

FLUTTER COMPENSATED MAGNETIC TAPE TRANSDUCING DRIVE APPARATUS

The present invention relates to magnetic tape transducing apparatus such as, for example, audio or video magnetic tape recorders/reproducers or the like, and more particularly to the drive system therefor, which is so arranged that random variations in tape speed are essentially eliminated.

BACKGROUND

Variations in tape drive speed affect the accuracy and fidelity of recording and reproduction of signals being transduced onto or from magnetic tape. Such external influences interfere with uniform passage, that is, with the uniformity of speed of magnetic tape in the guide path thereof. It has previously been proposed—see German Published patent application DE-AS No. 11 89 748—to utilize inertia masses which are of equal size and which operate at the same speed but in opposite direction of rotation, and which are coupled to the drive arrangement of the magnetic tape transport in order to eliminate undesirable variations in tape transport speed which, for simplicity, may be referred to as "flutter". The inertia masses should have as large a dimension and weight as possible; due to the dimensioning of the inertia masses and the speed with which they operate, it is difficult to fit the system into recording/reproducing apparatus, particularly if intended for portable use. Limitations arise with respect to the spatial arrangement of the inertia masses, coupling into the drive or operating chain which is coupled to drive the tape and/or the tape reels or spools thereof. It is particularly difficult to fit such inertia masses into a recorder if, in accordance with an example, the shaft of one of the inertia masses is also the shaft of an audio system, and the shaft of the counter-rotating mass is coupled to the drive of the take-up reel or its drive mechanism.

A flutter compensation system for magnetic tape apparatus in which the tape can operate in two directions of movement is described in German Patent Disclosure Document DE-OS No. 19 35 828 in which a common belt drives two inertia wheels in opposite direction of rotation. This arrangement is provided essentially for rapid change-over of the direction of tape movement; nothing is stated with respect to dimensioning the inertia masses or their speeds in order to suppress flutter or to compensate for external influences on the operating speed of the unit.

It has also been proposed to apply an inertia mass to the shaft controlling the speed of movement of an audio tape in an audio recording/reproducing apparatus—see German Patent Disclosure Document DE-OS No. 23 50 237—in which two inertia masses are coaxially positioned. The inertia masses operate in opposite directions of rotation. It is the intention to eliminate external effects which are due to torsion or tipping or tilting, as well as rotary changes of speed. Such as arrangement requires, however, a comparatively long drive belt or drive connection cable for the two inertia masses with several deflection or change-of-direction rollers. The highly desirable fixed and rigid coupling between the two inertia masses thus cannot be obtained. Further, the requirement for space to place the respective components as well as the weight are difficult to meet.

A tape recorder with an anti-flutter or speed variation mechanism is described in German Patent Disclosure Document DE-OS 29 30 896 in which the moment of inertia and angular speed of two oppositely rotating masses is determined and made equal. On the one hand, the rotary mass of the motor is used and, on the other, a separate flywheel concentric with the tape transport shaft. This arrangement is comparatively space-consuming and does not account for the influence of the rotating mass of the counter or engagement roller which is in contact with the tape and which, as is customary in such apparatus, presses the tape against the circumference of the drive capstan.

THE INVENTION

It is an object to provide a flutter-compensated tape drive which utilizes as many elements as are already present, which is small and does not require additional structural units, so that the system is suitable for various types of recorder apparatus, including those which may be portable.

Briefly, in accordance with the invention, the mass of the counter roller normally in engagement with the side of the tape opposite that which is engaged by the drive capstan is matched to the mass of the drive capstan and its associated drive system, so that the mass of the counter roller - which necessarily rotates in the opposite direction of rotation as the drive capstan - itself can form a counter-rotating mass to thus, in combination with the drive capstan and its associated rotating system, compensate for external forces which might tend to change the speed of the tape. In accordance with a feature of the invention, the radii of the counter roller and of the drive capstan are so selected that the respective moments of inertia, about the respective axes of rotation, have the same relationship.

The system has the advantage that all elements necessary to compensate for flutter are already present, and the flutter compensation can be obtained by suitable dimensioning of, respectively, the drive capstan and/or the counter-rotating counter cylinder or counter roller, to thus form the drive system—which includes the drive capstan—and the counter roller itself as the inertia mass. It is then not necessary to provide any special bearings or separate journaling of separate flywheels or other inertia masses, and to overcome the necessarily resulting frictional losses which, again, can be sources of variations in the uniformity of operating speed.

The tight coupling, in operation, of the two counter-rotating masses due to the engagement of the capstan with one side of the tape and the counter roller with the other side of the tape permits a construction which has no special coupling elements between the two rotating masses; the rotary speed as well as the moment of inertia about the axis of rotation of the respective rotary element can be selected within wide ranges by suitable design and selection of the diameters of the rotating elements so that any desired moment of inertia can readily be obtained within the space and size limits of commercial apparatus.

Figure 2:
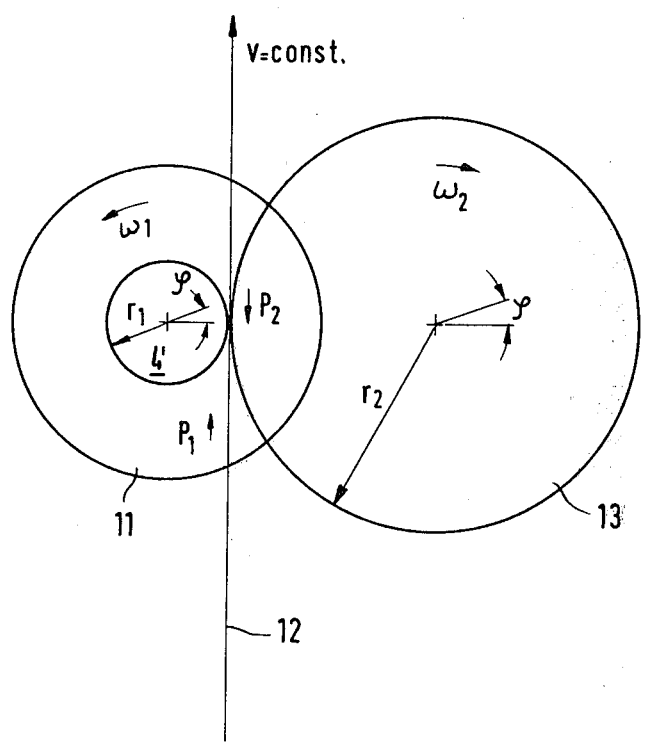

DRAWINGS:

FIG. 1 is a part-sectional, part side view of a drive arrangement for a magnetic tape in accordance with the present invention; and FIG. 2 is a diagrammatic view illustrating the force and motion relationships of the respective rotating elements and of the tape.

A fixed housing 1, shown only in fragmentary form, retains two rolling bearings, for example ball bearings 2, 3, in which a drive shaft 4 is journaled. The drive shaft 4, at a projecting terminal end, carries a capstan 4' which is in surface engagement with one side of a tape 12. The shaft 4 at the end opposite the capstan 4' is formed with a central bore 5, in which the shaft 6 of a motor 7 is fitted. A set screw 8 connects the shaft 6 and the shaft 4 together. The rotor 11 of the motor is freely retained within the housing 9 of the motor. Housing 9 is secured to the shaft. The rotor 11, thus, floats and does not have any bearing by itself. A spring 5' is located internally of the bore 5 to permit easy adjustment of the axial position of the rotor 11 within the motor housing 9. The magnetic tape 12 is pressed against the circumference of the capstan 4' in customary manner by a counter roller or pressure roller 13. The pressure roller is rotatable about an axis 14. Axis 14 can be moved towards and away from the capstan 4', as well known, for example by pivoting or tilting to effect pressure engagement against the reverse side of the tape 12 if drive is intended, or to be removed from the tape 12 to permit the capstan 4' to run freely. FIG. 2 is a highly schematic top view of the arrangement of FIG. 1, omitting all components not necessary for an understanding of the invention.

The capstan 4, together with other rotary components thereof, such as the inner race of the bearings 2, 3, the rotor 11 of the motor, and a transducer disk 16 to provide a speed signal, forms a rotary or drive system. Under operating conditions, the capstan 4', which is part of the drive system, rotates with a speed of revolution $\omega_1$. The system has an overall moment of inertia $J_1$. A rotary force applied externally on the rotating system results in an angular acceleration $\epsilon$ which is of equal magnitude and effective in the same direction on the capstan 4' and the remainder of the rotary system coupled thereto, effective about the axis of rotation of the capstan 4' on the one hand, and on the counter or pressure roller 13 about its axis of rotation 14, on the other. In order to eliminate effects of such external rotary forces on the tape, that is, to prevent change in speed of the tape 12, the circumferential forces $P_1$ between the capstan 4' and the tape, and $P_2$ between the counter roller 13 and the tape must be equal and in opposite direction. For the tape capstan shaft 4, and its capstan 4', the rotary moment of inertia about its axis of rotation will be:

$$M_1 = J_1 \times \epsilon = P_1 \times r_1 \qquad (1)$$

For the counter or pressure roller 13, about its axis of rotation 14, the moment of inertia will be $$M_2 = J_2 \times \epsilon = P_2 \times r_2, \qquad (2)$$

wherein the subscript 1 denotes the respective parameter of the capstan 4', and the subscript 2 the respective parameter of the counter or pressure roller 13.

Setting $P_1 = P_2$, then results in $$\frac{J_1 \times \epsilon}{r_1} = \frac{J_2 \times \epsilon}{r_2} \qquad (3)$$

from which it will be apparent that $$\frac{J_1}{J_2} = \frac{r_1}{r_2} \qquad (4)$$

In words, the expression of equation 4 means that any external rotary acceleration (or deceleration) will have no influence on the uniformity of speed of the overall system if the moment of inertia of oppositely rotating drive system or guide elements have the same relationships as the radii $r_1$, $r_2$ of the respective contacting rotating elements, that is, the capstan 4' and the drive roller 13, respectively. FIG. 2 graphically shows the relationship, wherein the forces $P_1$, $P_2$ are shown, the speed of the tape V is constant, and the angle $\Phi$ through which the acceleration acts is also shown. The rotary speeds are, respectively, indicated by the arrows $\omega_1$, $\omega_2$.

The above derivation of course is not restricted to an arrangement which has a capstan shaft 4 and a capstan 4', and a counter or pressure roller 13; it is effective for all rotating masses, in which the rotary speed has a linear relationship with respect to the circumferential speed V which, of course, will correspond to the linear tape speed in the tape recorder apparatus.

We claim:

1. Flutter compensated magnetic tape transducing drive apparatus comprising
    a drive system having a first mass rotating in a first direction, including a drive capstan (4') positioned to drive a tape (12) and means to drive the capstan, the tape having one side thereof in engagement with the circumference of the capstan; and
    a counter or pressure roller (13) positioned to engage the other side of the tape (12) and press the tape against the circumference of the drive capstan (4'), said counter or pressure roller being in frictional engagement with the tape, and rotating in a direction of rotation opposite to the first direction
    wherein the counter roller (13) has a mass which is matched to the mass of the drive system to form a counter-rotating mass to compensate for external rotary forces acting on the tape, and wherein the moment of inertia of the drive system about the axis of rotation of the drive capstan (4') and the moment of inertia of the counter roller (13) about its axis of rotation are related by the equation:

$$\frac{J_1}{J_2} = \frac{r_1}{r_2}$$

wherein $J_1$ is the moment of inertia of the drive system about the axis of rotation of the drive capstan (4');
    $r_1$ is the radius of the drive capstan (4');
    $J_2$ is the moment of inertia of the counter or pressure roller (13) about its axis of rotation (149; and
    $r_2$ is the radius of the counter or pressure roller (13).
2. Apparatus according to claim 1, wherein the means to drive the capstan includes a rotor (11) of a drive motor (9);
    a connecting shaft (4) connecting said capstan (4') and said rotor (11);
    and rotating bearing components journaling said shaft in a frame (1) and rotating with said shaft.

* * * * *